United States Patent [19]

Smith

[11] 4,299,706

[45] Nov. 10, 1981

[54] SEPARATION OF A SUSPENSION OF TWO IMMISCIBLE FLUIDS

[75] Inventor: Peter B. Smith, Holmes Chapel, England

[73] Assignee: Fram Europe Limited, Great Britain

[21] Appl. No.: 97,226

[22] Filed: Nov. 26, 1979

[30] Foreign Application Priority Data

Nov. 24, 1978 [GB] United Kingdom .............. 46046/78

[51] Int. Cl.³ ............................................. B01D 21/10
[52] U.S. Cl. ................................... 210/649; 210/790; 210/799; 210/306; 210/307
[58] Field of Search ................ 210/84, 23 R, DIG. 5, 210/521, 522, 301, 306, 307, 649, 708, 790, 799

[56] References Cited

U.S. PATENT DOCUMENTS

| | | | |
|---|---|---|---|
| 2,713,919 | 7/1955 | Walker et al. | 210/23 R X |
| 2,875,900 | 3/1959 | Henkel et al. | 210/301 |
| 3,503,514 | 3/1970 | Lawson | 210/301 |
| 3,645,398 | 2/1972 | Fiocco | 210/DIG. 5 X |
| 3,919,084 | 11/1975 | Bebech | 210/84 X |
| 4,056,477 | 11/1977 | Ravitts | 210/522 |
| 4,132,651 | 1/1979 | de Jong | 210/522 |
| 4,172,789 | 10/1979 | Huardeau | 210/522 X |

FOREIGN PATENT DOCUMENTS 598846 3/1978 U.S.S.R. ....................... 210/DIG. 5

*Primary Examiner*—Frank A. Spear, Jr.
*Attorney, Agent, or Firm*—W. R. Hulbert

[57] ABSTRACT

Separation of a suspension of two immiscible fluid components is accomplished in a cylindrical pressure vessel divided into a main chamber and, at one axial end, a secondary chamber. A series of sinusoidal plates in the main chamber provides a tortuous passage for fluid to the secondary chamber. The two components tend to separate during such passage, the less dense component collecting in the upper part of the main chamber and the denser component passing to the secondary chamber. The vessel is provided with an inlet to the main chamber, a first outlet from the main chamber for the less dense component and a second outlet for the denser component exiting from the secondary chamber.

8 Claims, 8 Drawing Figures

SEPARATION OF A SUSPENSION OF TWO IMMISCIBLE FLUIDS

FIELD OF THE INVENTION

This invention relates to the separation of a suspension of two generally immiscible fluid components. More particularly, but not necessarily exclusively, it is concerned with the separation of oil from water.

BACKGROUND OF THE INVENTION

The separation of immiscible fluid components, such as oil and water is of substantial economic importance in many industries. Installations for achieving a passable degree of such separation represent an important capital expense in such industries and the installations themselves may be of substantial size. A typical installation might employ a cylindrical pressure vessel with a diameter in the region of one meter and an axial length of some 3 meters arranged horizontally, the tank having a collector vessel attached thereto, the overall vertical dimensions of the installation being in the region of 2 meters. The pressure vessel of a typical such prior proposed separation apparatus is divided into a main chamber and a secondary chamber at one axial end thereof. The fluid to be separated is fed into the main chamber and the less dense separated component is withdrawn from the upper regions (typically from a collector dome) of the main chamber. The two components are separated by tortuous passage through separation means such as a plate pack in passage from the main chamber to the secondary chamber, separation being achieved by the tortuous passage and the denser component passing through into the secondary chamber.

We have sought to improve upon this prior proposal in a way which allows similar or enhanced efficiency of separation to be achieved in an apparatus of lesser overall dimensions for substantially the same through-put.

SUMMARY OF THE INVENTION

We describe below a preferred embodiment of apparatus in accordance with this invention for separation of a suspension of two immiscible fluid components, which apparatus comprises a generally cylindrical pressure vessel having a main chamber and a secondary chamber at one axial end thereof, and being provided with an inlet opening into the main chamber, a first outlet for the less dense component exiting from the main chamber and a second outlet for the denser component exiting from the secondary chamber; and a separation means being mounted within the main chamber and adapted to provide tortuous passage for fluid from the main chamber to the secondary chamber, whereby the two fluid components tend to be separated by passage through said separation means, whereby the less dense component tends to collect in the upper part of the main chamber and the denser component tends to pass through into the secondary chamber, the separation means being generally rectangular in external configuration in axial section of the vessel; and the inlet comprising an inlet pipe which enters the main chamber at a position away from the secondary chamber, the inlet pipe being divided into a plurality of discharge pipes extending through the space between the exterior of the separation means and the cylindrical wall of the main chamber and terminating short of the dividing wall separating the main chamber from the secondary chamber.

As will be evident, this arrangement results in incoming fluid being subject first to flow division and then to flow reversal twice before passing in to the separation means. Our tests have shown that this incoming flow pattern aids in separation of suspended oil from water. In this arrangement, incoming fluid discharged at the ends of the discharge pipes passes back along the whole length of the discharge pipes externally thereof before entering the separation means, which preferably comprises a so-called "plate pack" comprising a series of sinusoidal plates mounted effectively within a box like volume.

It will thus be seen that the invention provides, in its broadest method aspect, a method for separating the denser and less dense components of a suspension of two immiscible fluid components, the method comprising causing the less dense component to disentrain by causing the fluid to pass by tortuous passage through a separation means, and separating such disentrained less dense component, the method being characterised in that incoming fluid is subject first to flow division and then to flow reversal twice before passing into the separation means.

As a final separation of the less dense component from the denser component in the secondary chamber, the secondary chamber may be provided with a weir across the upper half thereof so that fluid entering the secondary chamber must pass underneath the weir in order to reach the outlet. During the dwell time of the fluid in the secondary chamber, minor remaining quantities of the less dense component tend to separate. Such minor quantities disentrained from the denser component tend to remain in the space preceding the weir.

The invention is hereinafter more particularly described by way of example only with reference to the accompanying drawings.

DESCRIPTION OF THE PRIOR ARRANGEMENT

Figure 1:
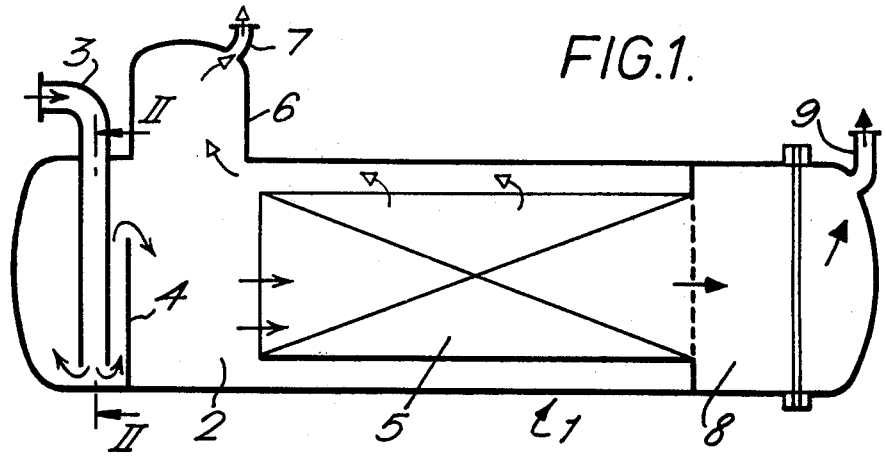
FIG. 1 is a schematic longitudinal sectional view of a previously proposed separation apparatus.

Incoming fluid, typically a suspension of oil droplets in water is pumped into cylindrical pressure vessel 1 of FIG. 1 under pressure, for example by means of a positive displacement low emulsifying pump. The incoming fluid enters main chamber 2 of vessel 1 through an inlet pipe 3 which extends to a position near the bottom of the chamber at a position close to a weir 4 over which the fluid must pass. This arrangement imparts upward flow in the incoming flow which aids the separation of oil droplets. The fluid then passes into a so-called "plate pack" 5 mounted in the main chamber and comprising a series of sinusoidal plates mounted effectively within a box like volume. This creates a tortuous path for the fluid which aids in coalescence and separation of oil from water. The oil (open arrows in the drawing) passes out of the top of the plate pack being less dense than water and collects in a collector dome 6 from which it is withdrawn through an outlet 7. The denser water (black arrows in the drawing) passes out through the end of the plate pack into a secondary chamber 8 from whence it is withdrawn through an outlet 9.

Figure 2:
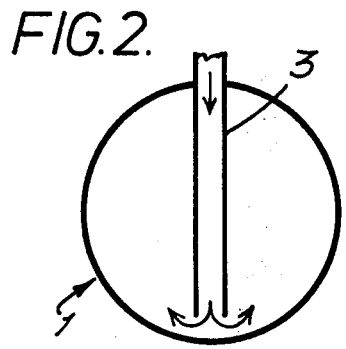
FIG. 2 is a sectional view taken along the line II—II in FIG. 1.

Practical embodiments of the prior arrangement illustrated in FIGS. 1 and 2 tended to be bulky being in the region of 3 meters long and, together with the associated piping and pumping means, some 2 meters tall overall. Clearly the larger the apparatus, the greater quantity of material is required in its manufacture and so the more expensive it tends to be. While practical embodiments of this apparatus could provide a passable degree of separation of oil from water, significant quantities of oil droplets remained entrained with the outgoing water.

DESCRIPTION OF THE PREFERRED EMBODIMENT

Figure 4:
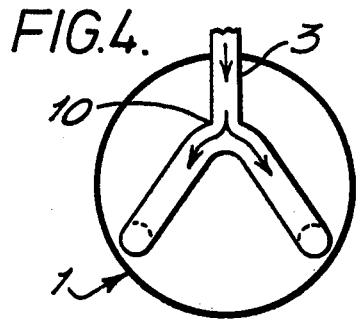
FIG. 4 is a sectional view taken along the line IV—IV in FIG. 3.
Figure 5:
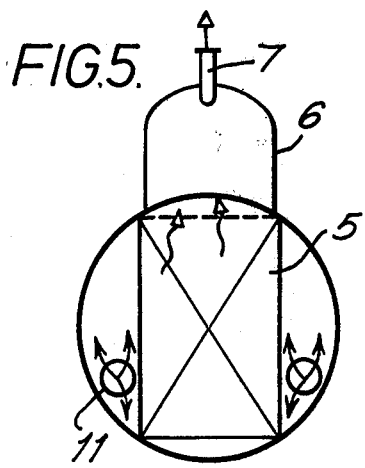
FIG. 5 is a sectional view taken along the line V—V in FIG. 3.
Figure 6:
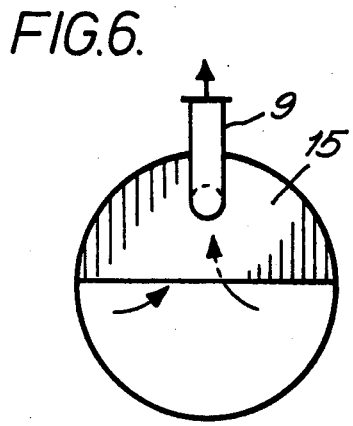
FIG. 6 is a sectional view taken along the line VI—VI in FIG. 3.
Figure 3:
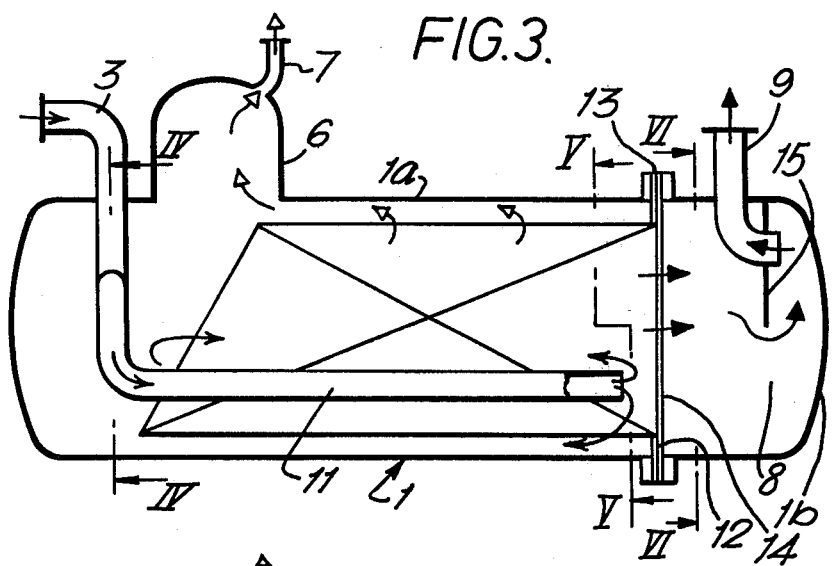
FIG. 3 is a view generally similar to FIG. 1 but of a preferred embodiment of apparatus constructed in accordance with the present invention.

It will be seen immediately by comparison that the embodiment of FIG. 3 which is constructed in accordance with the present invention is significantly more compact than the arrangement of FIG. 1. In this case, the inlet pipe 3, which enters the main chamber at a position away from the secondary chamber, is connected to a flow divider 10 (see FIG. 4) which divides the incoming fluid flow and passes it to a plurality of discharge pipes 11. As is best shown in FIG. 5, the discharge pipes (here 2 in number) extend through the space which remains between the exterior of the platepack separation means and the inner cylindrical wall of the main chamber. Pipes 11 discharge close to dividing wall 12 which separates the main chamber from the secondary chamber. Fluid discharged at the ends of the discharge pipes 11 must pass back along the whole length of the discharge pipes externally thereof before it can enter the plate pack 5. The distance between discharge from the inlet pipe and entry into the plate pack during which incoming fluid must pass through fluid in the vessel 1 is of importance since it allows coalescing oil droplets to be disentrained and to rise to the upper part of the vessel. It is for this reason that it is impractical to make the arrangement of FIG. 1 more compact by bringing the plate pack closer to the weir 4. Our tests have shown that the incoming flow pattern of the embodiment of FIG. 3 aids in separation of suspended oil from water. The fluid flow is subject first to flow division and then to flow reversal firstly at the discharge ends of the pipes 11 and then upon entry into the plate pack.

It will be understood that the incoming flow could pass into more than two discharge pipes.

Pressure vessels of the kind described hereinabove are manufactured so that an end portion is detachable from the main part of the vessel for cleaning, maintenance and repair. In our arrangement the plate pack 5 is mounted on an end plate 12 which is trapped between respective flanges 13, 14 of the two portions 1a and 1b of the vessel 1 so that the plate pack can be removed as a whole from the interior of the vessel. The denser water entering the secondary chamber 8 must pass under a weir 15 to reach outlet pipe 9. During the dwell time of the fluid in the secondary chamber, minor remaining quantities of the less dense oil component tend to separate. Such minor quantities disentrained from the denser water component tend to remain in the space preceding the weir.

Our tests employing an embodiment as shown in FIGS. 3 to 6 have shown an enhanced efficiency of separation of oil from water as compared with the prior art embodiment of FIGS. 1 and 2.

Figure 7:
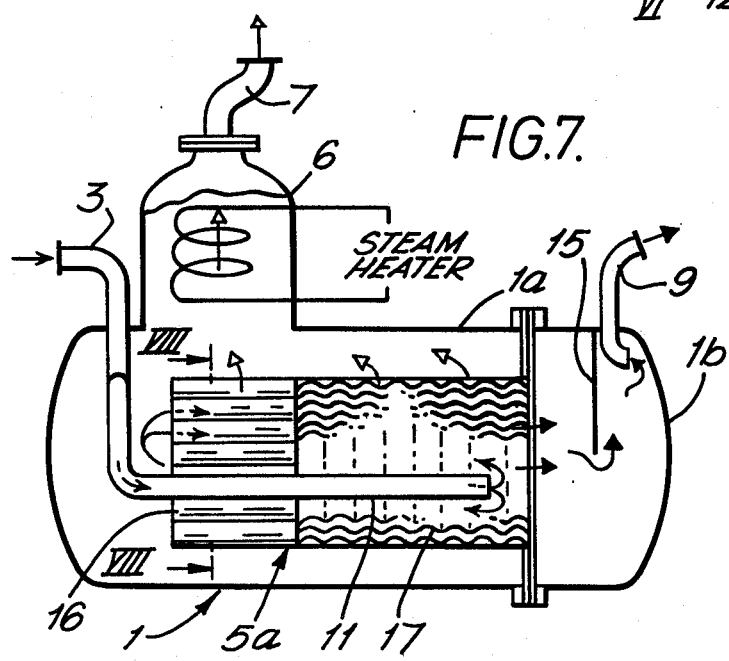
FIG. 7 is a view generally similar to FIG. 3 of a modified embodiment also in accordance with the present invention.
Figure 8:
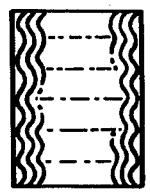
FIG. 8 is a sectional view taken along the line VIII—VIII in FIG. 7.

Various arrangements are possible for the plate pack 5. The plate pack may comprise a plurality of horizontally arranged sinusoidal plates with the peaks and troughs transverse to the general direction of flow of the denser component through the plate pack. Alternatively, the plates may be somewhat inclined at an angle between the horizontal and vertical and with the troughs and peaks in the individual plates again extending generally transverse to the flow direction of the denser component through the plate pack. The most preferred arrangement is that schematically illustrated in FIGS. 7 and 8 of the accompanying drawings. In this arrangement, the plate pack 5a comprises both vertically disposed sinusoidal plates 16 and generally horizontally disposed sinusoidal plates 17. As will be seen from FIGS. 7 and 8, the vertically disposed plates are disposed upstream, so far as the denser component is concerned, of the horizontally disposed plates. This arrangement has been found to be of particular benefit when an oil-water bilge contains significant quantities of solid matter or dirt. Oil being less dense than water separates and tends to move upward. In so doing, it impinges on the undersides of individual sinusoids where it accumulates until it has sufficient buoyancy to break clear of the surface of the plate and to rise upwards until it contacts the next vertically higher sinusoidal surface, the process then repeating. Dirt, on the other hand, being more dense than the denser liquid component, here water, settles out on the downwardly sloping surfaces of individual sinusoids, collecting there until the total mass collected overcomes the surface adhesion to the plate, at which point the mass of dirt slides off the sinusoidal surface and in doing so avalanches down the plate to collect at the bottom. As will be understood, this avalanche effect results in a self-cleaning function.

The horizontally disposed plates operate in the generally conventional fashion; that is, the tortuous path of fluid generally horizontally through the plate pack results in impingement of the fluid against successive surfaces of the pack tending to coalesce droplets of oil. Separated oil collects in the peaks of the sinusoidal surfaces and passes upward through bleed holes therein.

It will, of course, be appreciated that while the invention has been described hereinabove with particular reference to the separation of oil from water, the invention is not restricted to this one utility. Embodiments of apparatus constructed in accordance with this invention may find utility wherever it is desired to separate two immiscible components, one being denser than the other.

What is claimed is:

1. In an apparatus for separation of a supension of two immiscible fluid components, which apparatus comprises: a generally cylindrical pressure vessel having a main chamber and a secondary chamber at one axial end thereof, separated from each other by a dividing wall, and being provided with means defining an inlet opening into the main chamber, means defining a first outlet for the less dense component exiting from the main chamber and means defining a second outlet for the denser component exiting from the secondary chamber; and a separation means mounted within the main chamber and adapted to provide tortuous passage for fluid from the main chamber to the secondary chamber, whereby the two fluid components tend to be separated by passage through said separation means, whereby the less dense component tends to collect in the upper part of the main chamber and the denser component tends to pass through into the secondary chamber, the separation means being generally rectangular in external configuration in axial section of the vessel;

the improvement wherein the means defining the inlet comprises an inlet pipe which enters the main chamber at a position away from the secondary chamber, the inlet pipe being divided into a plurality of discharge pipes extending longitudinally through space defined between the exterior of the separation means and the cylindrical wall of the main chamber, and terminating adjacent the dividing wall separating the main chamber from the secondary chamber whereby fluid discharged from said discharge pipes must reverse its flow and travel to the opposite end of said separation means externally thereof before entering said tortuous passage.

2. Apparatus according to claim 1, wherein the separation means comprises a plate pack having a series of sinusoidal plates mounted within a box-like volume.

3. Apparatus according to claim 2, wherein the plate pack comprises a first series of generally vertically disposed sinusoidal plates with the peaks and troughs disposed generally in the direction of flow of the denser component through the plate pack; and a second series of generally horizontally disposed sinusoidal plates mounted downstream of the first series relative to the flow direction of the denser component through the plate pack, the peaks and troughs of the second series extending generally transverse to the flow direction of the denser component through the plate pack.

4. Apparatus according to claim 2, wherein the cylindrical pressure vessel comprises a main portion and an end portion detachable from the main portion for cleaning, maintenance and repair of the interior of the pressure vessel; and wherein the plate pack is mounted on an end plate which is trapped in use between respective flanges formed on the main portion and end portion of the pressure vessel where these meet, the arrangement being such that when the end portion is detached from the main portion, the plate pack may be removed as a whole from the interior of the vessel.

5. Apparatus according to claim 1, wherein the secondary chamber is provided with a weir across the upper portion thereof so that fluid entering the secondary chamber must pass underneath the weir in order to reach the second outlet, the arrangement being such that minor remaining quantities of the less dense component tend to disentrain during the dwell time of the fluid within the secondary chamber and to collect in the space preceding the weir.

6. A method for separating the denser and less dense components of a suspension of two immiscible fluid components, the method comprising causing the less dense component to disentrain by causing the fluid to pass by tortuous passage through a separation means, and separating such disentrained less dense component, the method being characterised in that incoming fluid is subject first to flow division then discharged at a location external of but near the downstream end of the separation means and then subjected to flow reversal twice before passing into the upstream end of the separation means.

7. A method according to claim 6, wherein the separation means through which the fluid is caused to pass comprises a first series of sinusoidal plates disposed generally vertically with individual peaks and troughs extending generally in the direction of flow of the denser component through the separation means, and a second series of generally horizontally disposed sinusoidal plates with the individual peaks and troughs thereof extending generally transverse to the flow direction of the denser component through the separation means.

8. A method according to claim 6, wherein the denser component after passage through the separation means is caused to pass beneath a weir in order to reach an outlet, the dwell time of the fluid before the weir being such that minor remaining quantities of the less dense component in the denser component tend to disentrain.

* * * * *